T. J. Sloan.

Making Wood Screws.

N° 9,222.  Patented Aug. 24, 1852.

UNITED STATES PATENT OFFICE.

THOMAS J. SLOAN, OF NEW YORK, N. Y.

IMPROVEMENTS IN MECHANISM FOR GRIPPING WOOD-SCREW BLANKS, &c.

Specification forming part of Letters Patent No. 9,222, dated August 24, 1852.

*To all whom it may concern:*

Be it known that I, THOMAS J. SLOAN, of New York city, New York, have invented a certain new and useful Improvement in the Method of Operating the Gripping Jaws in Machinery for the Manufacture of Wood-Screws; and I do hereby declare that the following is a full, clear, and exact description thereof, reference being had to the accompanying drawings, making part of this specification, in which—

Figure 1:
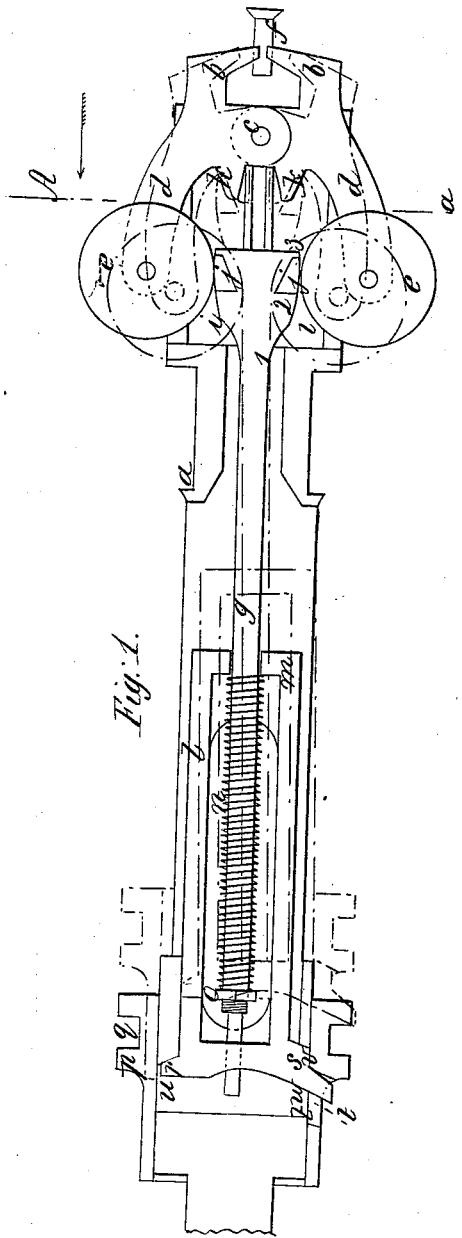
Figure 2:
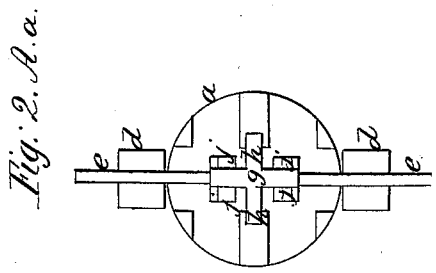

Figure 1 is a longitudinal section of the mandrel of a screw-threading or head-shaving machine with my improvement applied, and Fig. 2 a cross-section taken at the line $a\,a$ of Fig. 1.

The same letters indicate like parts in the two figures.

In machinery for threading wood-screws or shaving the heads thereof it is highly important that the blank should be gripped with a proper degree of force. If the force be too great the shank is thereby injured and the jaws strained and frequently broken, and if insufficient the blank will sometimes turn in the jaws when it meets with resistance from the cutter that operates on it, and as the blanks frequently vary in diameter from various causes much inconvenience has been experienced from the difficulties enumerated.

The object of my invention is to render the jaws self-adapting to the varying sizes of blanks, so as to grip and hold them with a uniform, or nearly uniform, force, which I accomplish by my improvement, which consists in combining with a wedge on the end of a stem or rod inside of the hollow mandrel, (as heretofore employed,) which (wedge or inclined planes) acts on the arms of the two jaws to cause them to grip the shank of the screw blank, an apparatus which gives the longitudinal motion to the stem by means of a spring, the tension of which is the measure of force which can be applied to the jaws to grip the blank, the said spring-connection yielding to any inequality in the size of the blank.

My invention also consists in making the faces of the wedge in curved lines in combination with the spring connection, so that when the tension of the spring is weakened by reason of the greater range of motion of the stem required to grip a small screw the force of the wedge shall be increased in the same, or nearly the same, ratio, and thus insure the gripping with an equal force, or nearly so.

In the accompanying drawings, $a$ represents a mandrel such as is employed in machines for threading wood-screws or shaving the heads thereof. This mandrel is hollow, and on its front end it carries two jaws $b\,b$, turning on one and the same joint-pin $c$. The rear arms $d\,d$ of these jaws are curved outward and are provided each with a roller $e$, so that when these rollers are drawn toward each other the jaws are opened to liberate the screw-blank $f$, and when forced apart they grip the said blank. There is a rod or bar $g$ that plays freely within the hollow of the mandrel and guided at its forward end by means of two spurs $h\,h$, fitted to run longitudinally in grooves made in the inside of the head of the mandrel. The forward end of the rod $g$ is made wedge-formed on two opposite sides, as at $i\,i$, for the purpose of acting on the rollers of the jaws in the gripping operation. From the stem of the rod at 1 to 2 the wedge-faces run out with a sudden curve (or angle) to cause the jaws to close on the screw-blank suddenly when one is presented, and from 2 to 3—the extreme end—they gradually run toward a parallelism with the axis of the rod, so as to act with a gradually-increasing force on the jaws, the forces being greater as the faces approach to a line parallel with the axis of the rod, which is the line of its motion during the gripping operation. From this it will be seen that as the rod is drawn back the jaws are closed by the action of the wedge-formed faces on the rollers, and as the rod is pushed forward the rollers are free to move inward to open the jaws for the liberating of a blank, which is effected by means of two spurs $j\,j$ on each side of the wedge part of the rod, which, as the rod is pushed forward, act by their inside inclined faces against two lips $k\,k$ on the inside of the arms of the jaws. The stem of the rod $g$ extends back and passes freely through holes in the ends of a frame $l$, which is fitted to slide in a mortise $m$ made through the body of the mandrel, and the said rod is connected with the said frame by means of a helical spring $n$, coiled around the stem and interposed between the forward end of the frame, and a nut $o$, tapped on the stem near its rear end, so that when the frame is drawn back it acts on the stem through the tension of the said spring, which can be regulated at pleasure by means of the nut $o$.

The motion for operating the jaws is communicated to the frame by means of a collar $p$, which slides longitudinally on the mandrel and provided with the usual groove $q$ to receive the end of a lever when used in the machine, by which it is made to slide on the mandrel at the required period. When the collar and frame are in the forward position represented by red lines in Fig. 1, a latch projection $r$ on one side of the frame bears against the inner face of the hollow mandrel, and on the opposite side of the frame there is another projection $s$, which passes through a corresponding mortise $t$ in the collar, the faces of the projection and the mortise being inclined. When the collar is pushed back, the face of the mortise strikes against the inclined shoulder of the projection $s$ of the frame and draws the frame back, and by the tension of the helical spring the stem also, which has the effect to close the jaws, and this is continued until the latch projection $r$ on the other side of the frame reaches a mortise $u$ in the mandrel, when the action of the collar on the inclined face of the projection $s$ forces the frame laterally until it is firmly latched by the entrance of the projection $r$ in the mortise $u$, which enables the collar to slide onto the parallel face $v$ of the projection $s$, by which means the frame and stem and their appendages are kept in that position with the jaws forcibly closed without there being the slightest end pressure on the mandrel.

For the purpose of unlatching and pushing forward the frame and stem to open the jaws, the collar must be pushed forward, which brings the back shoulder of the mortise $t$ of the collar against the back and inclined face $w$ of the projection $s$ to draw the frame laterally and draw the latch projection $r$ out of the mortise in which it lies when the frame is latched.

It will be seen from the foregoing that the spring, being set to a certain tension by the nut $o$, when the frame is drawn back and latched, the spring is contracted and acts on the stem to close the jaws with a force due to its tension, so that the jaws may grip blanks of varying sizes, which could not be done without undue strain on the connections if the spring were not interposed, and it will also be seen that the smaller the blank to be gripped the greater will be the range of motion of the stem. Hence the spring would exert less force on the jaws when gripping a small blank than when gripping a large one, which irregularity is avoided by the curved plane of the wedge-faces from 2 to 3, which increase the force of the wedge in proportion to the decreasing tension of the spring by reason of the increasing range of motion of the stem.

The method of regulating the force of the grip and giving motion to the stem through the spring can be employed in connection with any other mode of giving the motion to the sliding frame and holding it, although I prefer to employ the mode herein described from its superiority to all others before known.

What I claim as my invention, and desire to secure by Letters Patent for operating the gripping-jaws on the mandrels of machines for threading or shaving the heads of wood-screws, is—

1. The employment of a wedge on a stem within the mandrel to act on the jaws to close them, substantially as specified, when the said wedge-stem is combined with a sliding frame or its equivalent, by means of an interposed spring, substantially as specified, for the purpose of adapting the jaws to the gripping of blanks of varying sizes, as set forth.

2. In combination with the said spring-connection, for the purpose specified, the making of the wedge-faces curved, substantially as specified, to insure an equal, or nearly, force on the gripping-jaws, as set forth.

THOMAS J. SLOAN.

Witnesses:
WM. BISHOP,
HENRY C. BANKS.